US006390205B2

(12) United States Patent
Wallgren et al.

(10) Patent No.: US 6,390,205 B2
(45) **Date of Patent: *May 21, 2002**

(54) POWER TOOL SYSTEM WITH PROGRAMMABLE CONTROL UNIT

(75) Inventors: Carl Johan Erik Wallgren, Stockholm; Henrik Glader, Vällingby, both of (SE)

(73) Assignee: Atlas Copco Tools AB, Nacka (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/458,275

(22) Filed: Dec. 9, 1999

(30) Foreign Application Priority Data

Dec. 10, 1998 (SE) .............................................. 9804273

(51) Int. Cl.[7] ............................ B23B 23/14; B23Q 5/10

(52) U.S. Cl. ............................... 173/2; 173/4; 173/217; 173/171; 81/467; 81/469; 318/434

(58) Field of Search ............................... 173/2, 4, 176, 173/216, 217, 171; 81/474, 470, 467, 469; 318/434

(56) References Cited

U.S. PATENT DOCUMENTS

| | | | | | |
|---|---|---|---|---|---|
| 4,829,650 | A | | 5/1989 | Galard | |
| 5,014,794 | A | * | 5/1991 | Hansson | 173/2 |
| 5,094,301 | A | | 3/1992 | Wipperman et al. | |
| 5,203,242 | A | * | 4/1993 | Hansson | 81/474 |
| 5,205,031 | A | | 4/1993 | Hansson | |
| 5,361,852 | A | * | 11/1994 | Inoue et al. | 173/176 |
| 5,713,250 | A | * | 2/1998 | Hendricks et al. | 173/2 |
| 5,754,019 | A | * | 5/1998 | Walz | 318/434 |
| 6,105,475 | A | * | 8/2000 | Ohmi et al. | 81/469 |

FOREIGN PATENT DOCUMENTS

| | | |
|---|---|---|
| EP | 0 436 843 A1 | 7/1991 |
| FR | 2 752 765 | 3/1998 |

* cited by examiner

*Primary Examiner*—Scott A. Smith
(74) *Attorney, Agent, or Firm*—Frishauf, Holtz, Goodman, Langer & Chick, P.C.

(57) ABSTRACT

A power tool system comprises a portable power tool (10), an operation control device (11) including an integrated memory (16) for storing power tool operation data, and an auxiliary memory module (18) normally containing the same power tool operation data as the integrated memory (16) easily connectable and disconnectable in relation to the control the operation control device (11), wherein the auxiliary memory module (18) serves as a removable back-up memory intended to carry operation data from one operation control device to another, notwithstanding the control device being integrated part of a battery powered tool or a separate unit at a main powered tool.

20 Claims, 2 Drawing Sheets

POWER TOOL SYSTEM WITH PROGRAMMABLE CONTROL UNIT

The invention relates to a power tool system including a portable power tool, and a control unit connected to the power tool and having an integrated memory for storing power tool operation data.

Power tool systems of this type are schematically described in U.S. Pat. Nos. 5,203,242 and 5,205,031.

A problem concerned with power tool systems of this type is the rather time consuming repair and restarting procedures at occurring malfunctioning of one or more parts of the system, which in many cases causes costly production stops, in particular when using the system at assembly lines. Such production stops may occur due to a malfunctioning power tool, a break down of the communication between the power tool and the control unit, or malfunction of the control unit.

In a system where the control unit is separated from the power tool and connected thereto by means of a multi-core cable, the most frequent production stops are due to a malfunctioning cable or its connection armatures fitted to the power tool and the control unit. Such break downs are normally quickly cured by replacing the faulty cable or cable connection parts. There is, however, required a trouble shooting procedure while the work to be performed by the tool is stopped. Also when the power tool is found to be the faulty link in the chain, the fastest way to get back into normal work is just to replace the power tool.

There is a problem, though, when the control unit breaks down, because apart from the trouble shooting time and the time required to replace the control unit, it will take some additional time to install into the memory of the new control unit the operation data relevant for the current tool application. This means that even if the faulty control unit is replaced some valuable time has to be spent programming the new unit with the relevant operation data.

In case of a battery powered tool having a built-in operation control device, any kind of power tool malfunction is cured by replacement of the entire tool. Accordingly the operation data have to be transferred to the new tool.

The main object of the invention is to provide a power tool system wherein the tool operation data are easily and quickly transferrable from one control unit or power tool control device to another, thereby bringing down the down time at production stops.

The above object is achieved by the invention as it is defined in the claims.

The invention is described by way of examples illustrated in the accompanying drawings.

Figure 1:
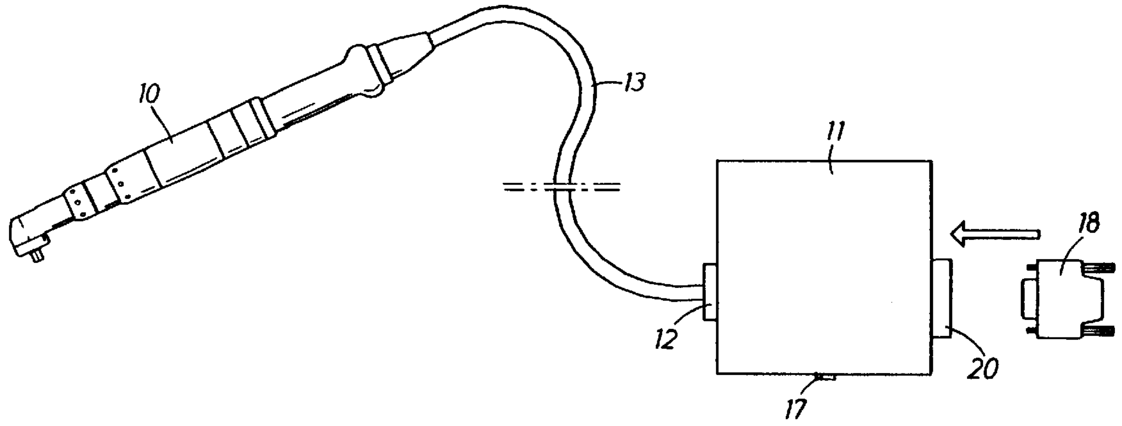
FIG. 1 shows schematically a power tool system according to the invention.
Figure 2:
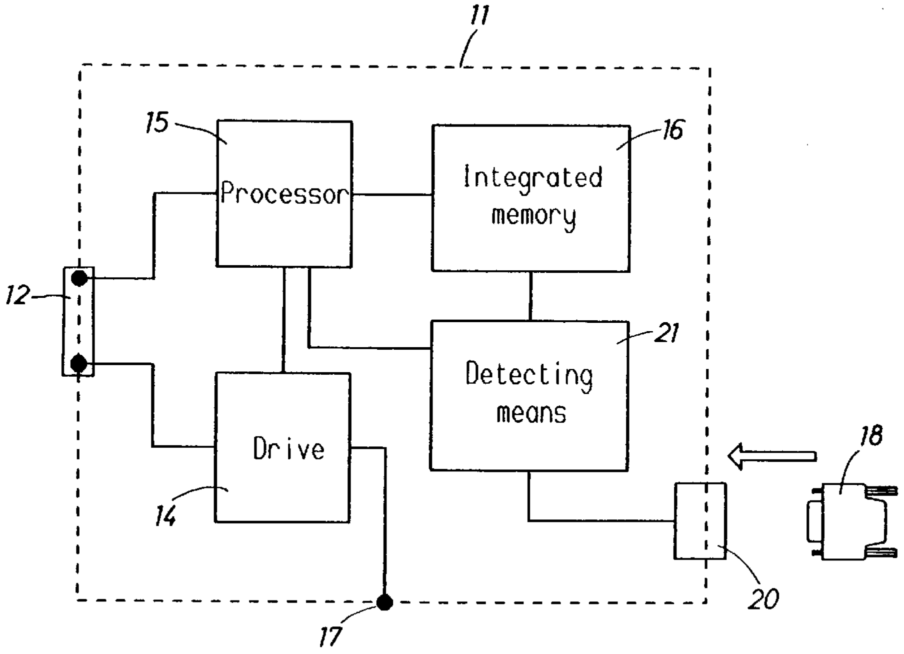
FIG. 2 shows schematically control unit comprised in the power tool system in FIG. 1.

The power tool system illustrated in FIGS. 1 and 2 comprises an electric angle nutrunner 10 having a synchronous permanent magnet motor (not shown), and an operation control unit 11 connected to the nutrunner 10 via an output connector point 12 and a multi-core cable 13.

The control unit 11 contains a motor drive section 14 for supplying an alternating current of variable amplitude and frequency to the nutrunner motor in accordance with desired operation parameter values. Further, the control unit 11 comprises a data processing section 15, and an integrated memory 16 connected thereto. The control unit 11 is connected to a mains voltage via a power supply point 17.

This basic type of nutrunner control unit is previously known per se. A suitable control unit is POWER FOCUS 2000 marketed by Atlas Copco Tools AB.

According to the invention, the control unit 11 is provided with an auxiliary memory module 18 which is disconnectably associated with the control unit 11. This auxiliary memory module 18 is intended to act as a back-up memory to the main integrated memory 16 and is arranged to be moved to another similar control unit in case of a system break down as described above.

In the embodiment of the invention illustrated in FIGS. 1 and 2, the auxiliary memory module 18 consists of a connector plug, and the control unit 11 is provided with a matching jack 20. The jack 20 is located on the control unit 11 so as to be easily accessible, thereby facilitating fitting and removal of the auxiliary memory module 18.

The control unit 11 also includes a communication device 21 which is connected both to the integrated memory 16 and to the auxiliary memory module 18 via the jack 20. This communication device 21 comprises detecting and comparating means for discovering discrepancies between the power tool operation data stored in the integrated memory 16 and those stored in the auxiliary memory module 18. This guarantees that there will always be the same data stored in the two memories, i.e. the auxiliary memory module 18 will act as a back-up memory and is always correctly updated. If and when disconnected and moved to another control unit, the auxiliary memory module 18 brings with it all the necessary power tool operation data information to a new control unit.

When fitting an auxiliary memory module 18 previously connected to another control unit, now taken out of operation due to malfunction, the power tool operation data thereby transferred to the new control unit may not be the same as the operation data already installed in the latter. Existing discrepancies between the data stored in the two memories are detected by comparison in the communication device 21, and the data stored in the auxiliary memory module 18 are copied into the integrated memory 16.

The auxiliary memory module 18 may also contain a program identifying code and will at connection to a control unit certify use of the installed program.

Although not specifically described, the invention is as well applicable on a pneumatic power tool system where the communication between the power tool and the control unit is accomplished via the pressure air supply conduit only or via an electric wiring associated with this conduit.

By the system according to the invention, there is obtained a quick and safe programming of a new control unit inserted as a replacement for a malfunctioning control unit.

In the above described embodiment of the invention, the auxiliary memory module is illustrated as a connector plug. This is just one example of such a module. Alternatively, the auxiliary memory module could be a memory card insertable into a card reading device.

Figure 3:
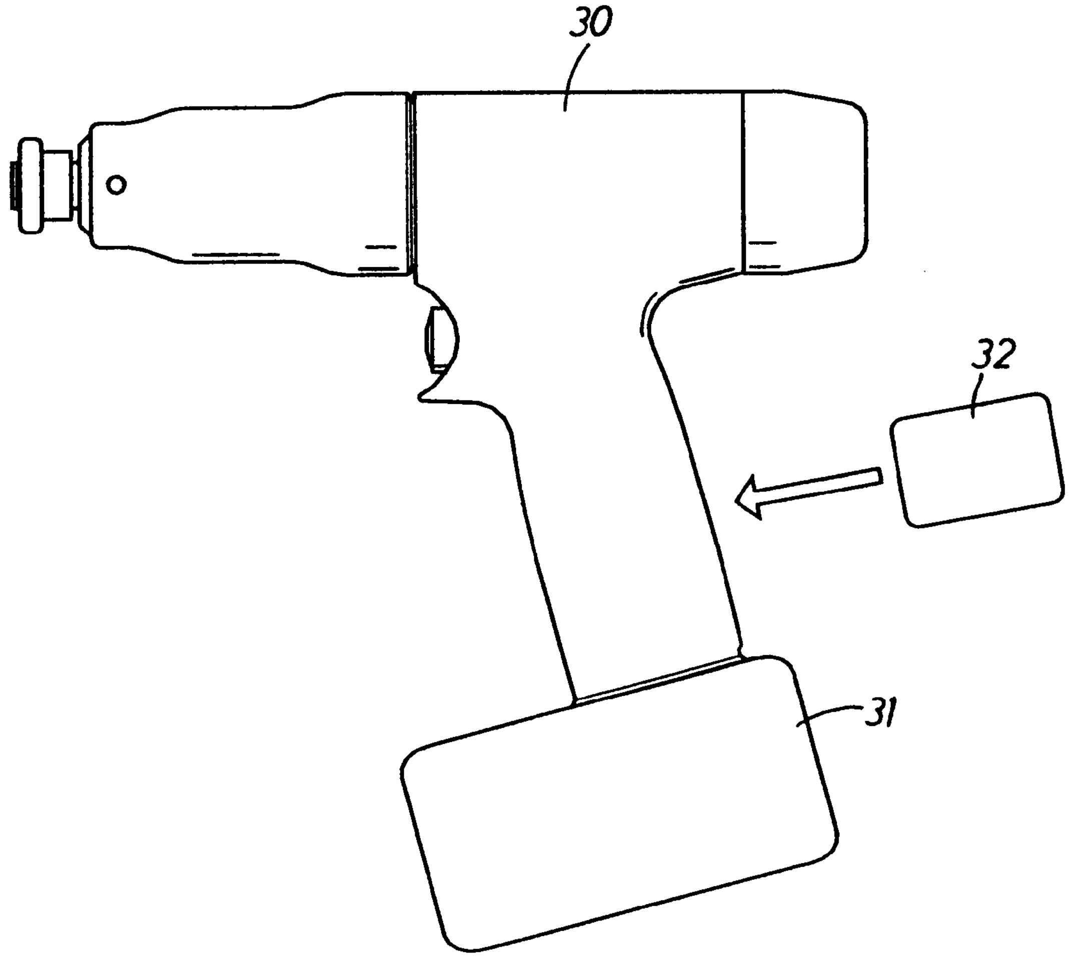
FIG. 3 shows a side view of a battery powered power tool including the features of the invention.

In the embodiment of the invention illustrated in FIG. 3, the power tool is a battery powered pistol type power wrench 30 carrying a replaceable and rechargeable battery unit 31. In this embodiment, there is used a memory card 32 to form an auxiliary or back-up memory module, and the power tool is provided with a card reading means. The latter is not illustrated in the drawing, but could be located anywhere in the power tool housing or in the battery unit 31, only it is not exposed to damage and dirt.

What is claimed is:

1. Power tool system, comprising a portable power tool (10), an operation control unit (11) including an integrated memory (16) for storing power tool operation data, and a connection means (12,13) connecting the power tool (10) to the control unit (11), characterized in that said control unit (11) comprises an auxiliary memory module (18) normally containing the same power tool operation data as said integrated memory (16), a contact means (20) for easy connection and disconnection of said auxiliary memory module (18) relative to said control unit (11), wherein said control unit (11) comprises a communication device (21) for communicating power tool operation data between said integrated memory (16) and said auxiliary memory module (18).

2. Power tool system according to claim 1, wherein said communication device (21) comprises a detecting means for detecting existing discrepancies between the data previously stored in said integrated memory (16) and the data stored in said auxiliary memory module (18) as said auxiliary memory module (18) is connected to said control unit (11), and said detecting means enabling transfer of the data stored in either one of said auxiliary memory module (18) and said integrated memory (16) to the other one of said auxiliary memory module (18) and said integrated memory (16) in case of occurring discrepancies.

3. Power tool system according to claim 2, wherein said auxiliary memory module (18) is comprise in a connector plug which is connectable to a matching jack (20) on said control unit (11).

4. Power tool system according to claim 3, wherein said auxiliary memory module (18) also comprises a program identifying and activating code.

5. Power tool system according to claim 2, wherein said auxiliary memory module (18) is comprised in a memory card.

6. Power tool system according to claim 5, wherein said auxiliary memory module (18) also comprises a program identifying and activating code.

7. Power tool system according to claim 2, wherein said auxiliary memory module (18) also comprises a program identifying and activating code.

8. Power tool system according to claim 1, wherein said auxiliary memory module (18) is comprised in a connector plug which is connectable to a matching jack (20) on said control unit (11).

9. Power tool system according to claim 8, wherein said auxiliary memory module (18) also comprises a program identifying and activating code.

10. Power tool system according to claim 1, wherein said auxiliary memory module (18) is comprised in a memory card.

11. Power tool system according to claim 10, wherein said auxiliary memory module (18) also comprises a program identifying and activating code.

12. Power tool system according to claim 1, wherein said auxiliary memory module (18) also comprises a program identifying and activating code.

13. Power tool system, comprising a power tool (30), an electric motor, a battery unit (31), and a control device connected to said motor and including an integrated memory for storing power tool operation data, characterized in that said control device comprises an auxiliary memory module (32) normally containing the same operation data as said integrated memory, a contact means for easy connection and disconnection of said auxiliary memory module (32) relative to said to said control device, wherein said control device comprises a means for communicating power tool operation data from said auxiliary memory module (32) to said integrated memory.

14. Power tool according to claim 13, wherein said control device comprises a detecting means for detecting existing discrepancies between the data previously stored in said integrated memory and the data stored in said auxiliary memory module (32) as said auxiliary memory module (32) is connected to said control device, and said detecting means enabling transfer of the data stored in said auxiliary memory module (32) to said integrated memory in case of occurring discrepancies.

15. Power tool according to claim 14, wherein said auxiliary memory module (32) also comprises a program identifying and activating code.

16. Power tool according to claim 15, wherein said auxiliary memory module (32) comprises a memory card.

17. Power tool according to claim 14, wherein said auxiliary memory module (32) comprises a memory card.

18. Power tool according to claim 13, wherein said auxiliary memory module (32) also comprises a program identifying and activating code.

19. Power tool according to claim 18, wherein said auxiliary memory module (32) comprises a memory card.

20. Power tool according to claim 13, wherein said auxiliary memory module (32) comprises a memory card.

* * * * *